United States Patent [19]
Hoggins et al.

[11] Patent Number: 5,525,802
[45] Date of Patent: Jun. 11, 1996

[54] LOW COST INFRARED WINDOW AND METHOD OF MANUFACTURE

[75] Inventors: James Hoggins, Plano; Thomas McKenna, Wylie, both of Tex.

[73] Assignee: Texas Instruments Incorporated, Dallas, Tex.

[21] Appl. No.: 288,366

[22] Filed: Aug. 9, 1994

[51] Int. Cl.$^6$ .................................................. G01J 5/08
[52] U.S. Cl. ........................................... 250/353; 250/347
[58] Field of Search .............................. 250/353, 338.1, 250/339.14, 342, 347

[56] References Cited

U.S. PATENT DOCUMENTS

| | | | |
|---|---|---|---|
| 4,716,294 | 12/1987 | Pettke et al. | 250/353 |
| 5,103,108 | 4/1992 | Crimmins | 250/353 |
| 5,324,586 | 6/1994 | Klocek et al. | 428/412 |

Primary Examiner—Davis L. Willis
Assistant Examiner—Richard Hanig
Attorney, Agent, or Firm—Brian A. Carlson; James C. Kesterson; Richard L. Donaldson

[57] ABSTRACT

A thermal imaging system (10) including a housing (12) having a cavity (28) therein is provided. A plurality of thermal sensors (14) are placed in the cavity (28) of the housing and an IR window (16) in the opening of the cavity protects the thermal sensors (14). The IR window (16) includes first (18) and second (20) faceplates formed from an IR transmissive material and a honeycomb support structure (22) between the faceplates for supporting the faceplates. The window (16) may also include an adhesive layer (25 & 26) between each faceplate and the support structure (22) for adhering each faceplate to the support structure (22).

23 Claims, 1 Drawing Sheet

LOW COST INFRARED WINDOW AND METHOD OF MANUFACTURE

CROSS REFERENCE TO RELATED APPLICATIONS

This application is related to U.S. Pat. No. 5,324,586, filed as Ser. No. 07/939,256 on Sep. 2, 1992; U.S. patent application Ser. No. 08/241,218, filed May 11, 1994, and U.S. patent application Ser. No. 08/289,404, filed Aug. 12, 1994, all assigned to the Assignee of the present application, TEXAS INSTRUMENTS INCORPORATED.

TECHNICAL FIELD OF THE INVENTION

This invention relates in general to the field of infrared windows and more particularly to a low cost, high strength, impact resistant infrared window.

BACKGROUND OF THE INVENTION

Thermal imaging systems that detect infrared radiation to produce an image capable of being visualized by the human eye are gaining widespread commercial use. These systems, which use a focal plane array (FPA) containing multiple thermal sensors, have been traditionally used in aerospace or military applications. In order for these systems to find success in the commercial market, reduction in their costs must be achieved.

A key component of thermal imaging systems is the window or dome used to protect the thermal sensors from the environment. These windows must be optically transparent in the 8 to 12 micrometer wavelength region to allow infrared (IR) energy to reach the thermal sensors. In order to achieve optical transparency, these IR windows are typically made of germanium, silicon, zinc sulfide, gallium arsenide, zinc selenide, and gallium phosphide, among other compounds. Windows made from these materials are typically very expensive.

Unfortunately, not only are windows made from those materials expensive, they are also prone to degradation or erosion when particles strike the window. Erosion of the window reduces its strength and ability to transmit infrared energy therethrough. This degradation can render the thermal sensors behind the window inoperable or even damaged should the window catastrophically fail.

Various methods have been previously developed to coat these IR windows. One previously developed solution to this problem involves placing protective coatings on the IR window. Because the protective coating must be transparent in the wavelength regions that the window operates, one type of protective coating has concentrated on traditional inorganic materials such as, for example, silicon, gallium phosphide, boron phosphide, diamond, germanium carbide, silicon nitride, silicon carbide, and oxides, to obtain the desired transparency. These coatings exhibit high strength, high fracture toughness, high hardness, and moderate to high elastic (Young's) modulus.

Another approach to protecting IR windows has been to use transparent polymer coatings that have low hardness and high strength on the surface of the windows. These polymers absorb and distribute the stresses of impacting particles, thereby protecting the underlying IR window. Such polymer coatings are generally inexpensive and readily available in films that can be placed on the exterior surface of an IR window. Unfortunately, these coatings are prone to delamination or peeling from the window's surface exposing the window to elements that may damage it. More importantly, these prior approaches that apply a protective coating to the IR window to protect the window require the traditional, generally expensive IR window. Including the traditional IR window with a protective coating in a thermal imaging system provides for a more durable system, but does not help reduce the system's costs. This prevents thermal imaging systems from achieving widespread commercial acceptance.

Yet another previous approach to building a low cost thermal imaging system has been to replace the traditional IR window with a window formed entirely from the IR transparent polymers. Unfortunately, the thickness required to achieve the desired strength and stiffness in a polymer window results in a window that presents a long optical path to incident IR energy. Significant amounts of the IR energy may be absorbed on this optical path through the polymer window preventing the IR energy from reaching the thermal sensors. This can prevent the thermal imaging system from providing the desired resolution during operation.

SUMMARY OF THE INVENTION

Therefore, a need has arisen for a low cost, high strength, impact resistant infrared window.

In accordance with the present invention, an IR window is provided that substantially eliminates or reduces disadvantages and problems associated with previously developed IR windows.

One aspect of the present invention provides an IR window for a thermal sensor having a first faceplate formed from an IR transmissive material, and a honeycomb support structure for supporting the faceplate. Another aspect of the present invention provides a method for making an IR window. The method includes applying a first faceplate of an IR transmissive material to a honeycomb support structure.

Yet another aspect of the present invention provides a thermal imaging system, including a housing having a cavity therein. A plurality of thermal sensors are placed in the cavity of the housing and an IR window in the opening of the cavity protects the thermal sensors. The IR window includes first and second faceplates formed from an IR transmissive material and a honeycomb support structure between the faceplates for supporting the faceplates. The window may also include an adhesive layer between each faceplate and the support structure for adhering each faceplate to the support structure.

The present invention provides numerous technical advantages. The present invention achieves an important technical advantage of low cost by eliminating the need for a traditional IR window or dome. By using a support structure with one or more polymeric IR transparent faceplates, technical advantages of a low cost, high strength, and impact resistant IR window may be achieved.

Another technical advantage of the present invention is the high degree of optical transparency it provides to IR energy. The present IR window achieves minimal absorption by minimizing the optical path for the IR energy in IR absorbing material in the window. By minimizing IR absorption within the window, more IR energy can reach the thermal sensors behind the window. This allows for achieving greater resolution with the thermal sensors.

Yet another technical advantage of the present invention is its suitability with numerous applications requiring an IR transparent window. The present IR window may be formed into many shapes or curves to meet the configuration of the desired application.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF THE INVENTION

Figure 1:
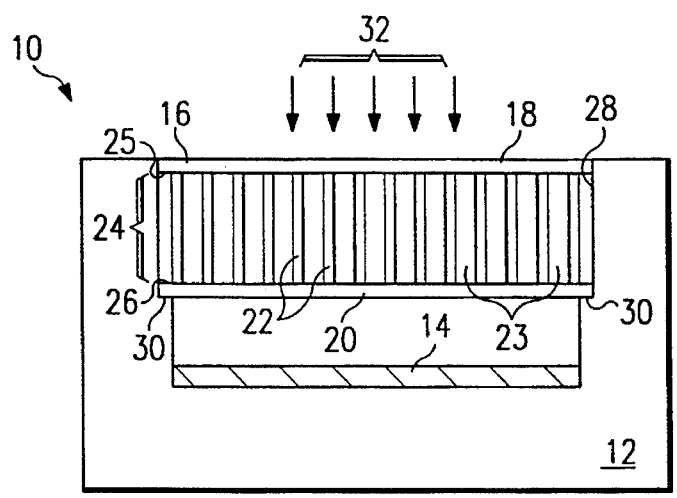
FIG. 1 depicts in cross section and in elevation an embodiment of the present IR window.
Figures 2A, 2B, 2C:
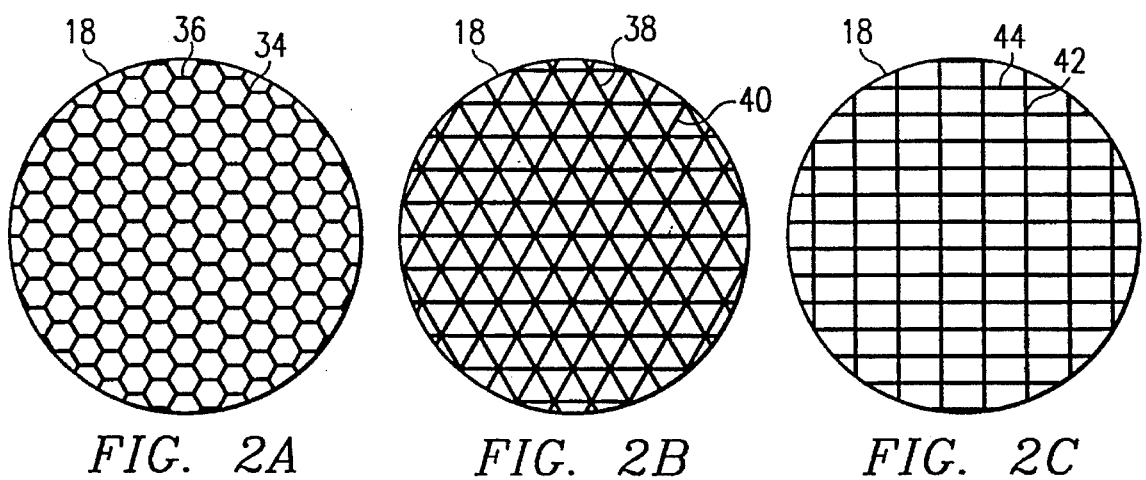
FIGS. 2A through 2C show top views of the present IR window depicting several configurations for the support structure.
Figure 3:
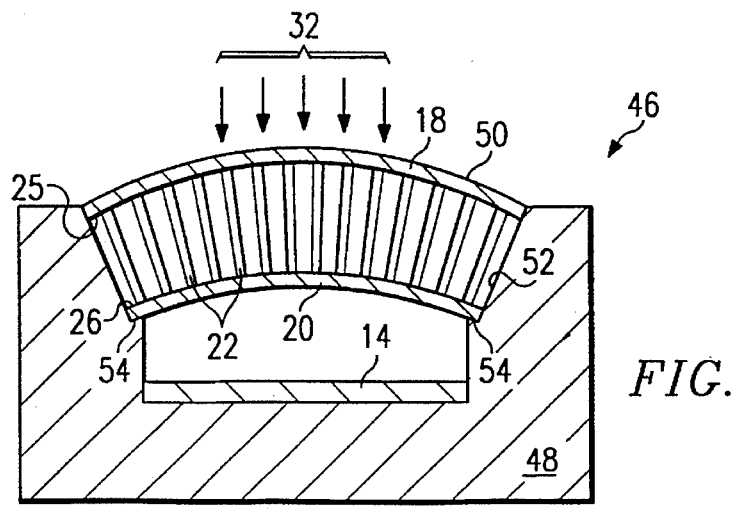
FIG. 3 illustrates in cross section and in elevation a curved embodiment of the present IR window.

Preferred embodiments of the present invention are illustrated in FIGS. 1 through 3, like numerals being used to refer to like and corresponding parts of various drawings.

FIG. 1 illustrates thermal imaging system 10 including housing 12, thermal sensors or focal plane array (FPA) 14, and IR window 16. Window 16 further includes a pair of faceplates, including exterior faceplate 18 and interior faceplate 20, and support structure 22 interposed between faceplates 18 and 20. In some embodiments of thermal imaging system 10, optics and lenses may be included in housing 12 between FPA 10 and IR window 16.

Support structure 22 may be any suitable metal, such as aluminum or copper, plastic, or formed from composite materials. In another embodiment, plastic is used for support structure 22 to reduce the weight and cost of IR window 16. Plastic used to form support structure 22 may or may not be transparent to IR energy. When non-IR transmissive material is used for support structure 22, a material that will reflect IR energy should be used. Dimensions for support structure 22 can vary depending on the strength desired for window 16. Depth 24 for IR window 16 is typically on the order of, for example, $\frac{1}{10}$" to $\frac{1}{4}$". Support structure 22 has voids 23 between exterior faceplate 18 and interior faceplate 20. Voids 23 may be evacuated as desired. Voids 23 provide an optical path through IR window 16 that absorbs little or no IR energy. Additional detail and embodiments for support structure 22 may be found in discussions relating to FIGS. 2A through 2C below.

Faceplates 18 and 20 of IR window 16 may be made from an IR transparent polymer material as disclosed and described in U.S. Pat. No. 5,324,586 and U.S. patent application Ser. No. 08/241,218. These patent applications are incorporated herein by reference. When faceplates 18 and 20 are formed in accordance with U.S. Pat. No. 5,324,586, they are a polymeric infrared transmitting sheet. IR transparent polymers and copolymers include, for example, polyethylene, ethylene-octene copolymer, polyvinyl pyrrolidene, poly(acenaphthylene), styrene/ethylene-butylene copolymer, poly(1-butene), polybrene, poly(acrylic acid, ammonium salt), polyamide resin, ethylene/propylene copolymer, and ethylene/propylene/diene terpolymer. These IR transparent polymers possess low hardness, high strength and low elastic (Young's) modulus. The thickness of faceplates 18 and 20 may be on the order of, for example, 1 to 10 mils.

In this first configuration for faceplates 18 and 20, the polymers of choice are those that provide infrared transmissivity in the desired wavelength range, such as, for example, 8 to 12 micrometers, hardness less than about 50 kg/mm$^2$, strength in the range of 10,000–100,000 psi, with a preferred value of greater than 20,000 psi, and an elastic (Young's) modulus in the range of 0.2 to 3×10$^6$ psi, and preferably less than 0.5×10$^6$ psi. Additional copolymers or terpolymers may be desirable to optimize the optical transparency and mechanical and thermal properties of faceplates 18 and 20. Candidates include neoprene, polyurethane, fluoroelastomer, polycarbonate, polyether sulfone, polyether ether-ketone, tetcel, and polyacrylate.

In an alternate embodiment of this first configuration, polytetrafluoroethelene (PTFE) and other perfluoro-compounds can be used as the polymer of choice to form faceplates 18 and 20. PTFE, commonly known as Teflon™, and perfluoro-compounds are generally IR transmissive in the 3 to 5 micrometer range.

In an alternate configuration of the present invention, faceplates 18 and 20 may be formed from a polymeric fiber weave as disclosed and described in U.S. patent application Ser. No. 08/241,218. Faceplates 18 and 20 in accordance with this application are a solid and continuous polymeric material in the form of a fabric of overlapping and underlapping sinusoidal woven fibers. The fibers are designed or derived from a high molecular weight polymer and consolidated to maintain the crystalline weave with a high degree of controlled orientation.

The polymeric fibers are preferably, but not limited to, polyethylene. The fibers are woven and consolidated to maintain the orientation of the crystallites and/or molecules in the weave. The weave is preferably accomplished by using just the woven fiber, but can also involve dispersing the woven polymeric fabric or chopped fibers in a matrix. The matrix may be preferably formed of a polymeric material suitable for use as required in U.S. Pat. No. 5,324,586 described above.

The woven fiber or the woven fiber and matrix are consolidated in some manner, such as, for example, by hot pressing, calendaring, tentering. The woven fiber fabric is heated under a pressure of about 1,000 psi or more, and preferably from about 1,000 to about 2,000 psi, to a temperature at or slightly above its melting point. The heated fiber fabric is held at this temperature for a minimum period of time necessary to cause consolidation of the woven fibers and/or the woven fibers and matrix, this taking generally less than about 60 minutes. The consolidated fibers and matrix are then cooled rapidly, generally in 5 minutes or less, to below 100° C. The rapid cooling maintains the long molecule chains (high molecular weight) intact to the greatest extent possible. This results in a faceplate that is strong in the plane of the faceplate, yet compliant and elastically deformable in the direction normal to the faceplate. This makes the faceplate capable of absorbing and storing impact stresses.

In an additional embodiment of faceplates 18 and 20, the matrix may be omitted. The polymeric fiber fabric can be heated under pressure and temperature conditions similar to those described for the fiber and matrix combination to cause the material forming the fibers to flow into the interstices between the fibers. This results in a continuous sheet of the fibrous material with the interstices filled with the polymeric material that has flowed between the fibers.

Any polymeric material with high strength (about 0.5 GPa or 70,000 psi) and high elastic modules (~25 Gpa or greater or $3.6\times10^6$ psi or greater) that is a thermoplastic that can be processed as described above may be used to form faceplates 18 and 20. Suitable polymers are generally linear polymer chains and generally have molecular weights on the order of about 1,000,000 or more. Examples of materials that can be used are, but are not limited to, gel spun, high molecular weight polyethylene, polypropylene, nylon, polyvinyl alcohol, and polyethylene terephythalate. A polyethylene fabric sold commercially under the name "Spectra" fiber by Allied Chemical Company and having a molecular weight of approximately 1,000,000 has been found to be suitable for use in forming faceplates 18 and 20.

It is noted that faceplates 18 and 20 need not be formed of the same material nor be of the same configuration. For example, faceplate 18 may be formed in accordance with the first configuration described above—a polymeric sheet, while faceplate 20 may be formed in accordance with the second configuration described above—a polymeric fiber weave.

Adhesive layers 25 and 26 may be used to adhere faceplates 18 and 20, respectively to support structure 22. Adhesive layers 25 and 26 may be a static or chemical bond, with or without an intermediate glue layer. An adhesive known as 3M 86 adhesive may be suitable to adhere faceplates 18 and 20 to support structure 22. Additionally, an $O_2$ plasma etching process may be used to form adhesive layers 25 and 26 between support structure 22 and faceplates 18 and 20. Adhesive layers 25 and 26 may also be formed from a combination of an adhesive and an $O_2$ plasma etching process.

Thermal imaging system 10 of FIG. 1 is formed by placing FPA 14 in cavity 28 of housing 12. Window 16 is placed in cavity 28 of housing 12 and sits on seats 30. A hermetic seal may be formed between window 16 and housing 12 as desired. In an alternate embodiment of IR window 16, a single faceplate is used. By eliminating interior faceplate 20, the optical path for IR energy through IR window 16 is minimized. Eliminating interior faceplate 20 may, however, result in a reduction in strength for IR window 16.

In operation of thermal imaging system 10 of FIG. 1, IR energy represented by arrows 32 enters thermal imaging system 10 through IR window 16. IR energy 32 travels through exterior faceplate 18, voids 26, interior faceplate 20, and on to FPA 14. Some IR energy may be absorbed by faceplates 18 and 20, but, by using support structure 22 between faceplates 18 and 20, the optical path and, therefore, absorption of IR energy in window 16, is minimized. Thermal imaging system 10 may be coupled to a display system for generating a display of the thermal image represented by IR energy 32. Thermal imaging system 10 may be mounted in a motor vehicle in order to provide a low cost infrared thermal imaging system.

FIGS. 2A through 2C depict top views of several embodiments for the support structure used with the present IR window. For the remaining discussions it will be assumed that the views of FIGS. 2A through 2C are looking down onto exterior faceplate 18.

FIG. 2A depicts hexagonal support structure 34 below exterior faceplate 18. Hexagonal support structure 34 is commonly referred to as a honeycomb structure. Any side 36 of a hexagon within honeycomb support structure 34 is approximately 1/10" to 1/4".

FIG. 2B shows honeycomb triangular support structure 38 under exterior faceplate 18. The triangles within honeycomb triangular support structure 38 have sides on the order of 1/10" to 1/4".

FIG. 2C shows honeycomb rectangular support structure 42 through exterior faceplate 18. Any side 44 of rectangular faceplate 42 is on the order of 1/10" to 1/4". It is noted that the rectangles of honeycomb rectangular support structure 42 may be squares. It is also noted that while three embodiments for the support structure used in accordance with the present IR window are depicted in FIGS. 2A through 2C, that the present invention is not limited to these structures. Many honeycomb structures, not explicitly identified, may be suitable for the shape of the support structure.

FIG. 3 illustrates in cross section and in elevation thermal imaging system 46 having housing 48, FPA 14, and IR window 50. Thermal imaging system 46 is similar to thermal imaging system 10 of FIG. 1 with the noted exception that IR window 50 is curved. Curved IR window 50 is placed in cavity 52 of housing 48 and is supported by seats 54. The curvature of IR window 50 may be desirable for thermal imaging systems requiring, for example, a dome to protect the thermal detectors.

The present invention provides a low cost, high strength, impact resistant IR window. The present IR window minimizes and achieves low cost by eliminating the need for the traditional IR window and uses in its place one or more polymeric IR transmissive faceplates with a support structure therebetween. The support structure is typically a honeycomb structure. The present invention provides technical advantages of low cost, high transmissivity, and is suitable for many applications of thermal imaging systems.

Although the present invention has been described in detail, it should be understood that various changes, substitutions, and alterations can be made hereto without departing from the spirit and scope of the invention as defined by the appended claims.

What is claimed is:

1. An IR window for shielding a thermal sensor from the environment, the window comprising:

a first faceplate formed from a first IR transmissive material forming an exterior protective surface of the window;

a second faceplate formed from a second IR transmissive material; and a honeycomb support structure interposed between the first and second faceplates for supporting the first and second faceplates.

2. The IR window of claim 1 further comprising an adhesive layer between the first faceplate and support structure for adhering the first faceplate to the support structure.

3. The IR window of claim 1 further comprising an adhesive layer between the second faceplate and support structure for adhering the second faceplate to the support structure.

4. The IR window of claim 1 wherein the first and second IR transmissive materials further comprise a polymer.

5. The IR window of claim 4 wherein the polymer further comprises one of polyethylene, ethylene-octene copolymer, polyvinyl pyrrolidene, poly(acenaphthylene), styrene/ethylene-butylene copolymer, poly(1-butene), polybrene, poly(acrylic acid, ammonium salt), polyamide resin, ethylene/propylene copolymer, and ethylene/propylene/diene terpolymer.

6. The IR window of claim 1 wherein the first and second IR transmissive materials further comprise a fabric of polymeric fibers and a matrix of polymeric material disposed in interstices between the fibers.

7. The IR window of claim 6 wherein the fibers further comprise one of gel spun, polyethylene, polypropylene, nylon, polyvinyl alcohol, and polyethylene terephythalate.

8. The IR window of claim 6 wherein the matrix further comprises one of polyethylene, ethylene-octene copolymer, polyvinylpyrrolidone, poly(acenaphthylene), styrene/ethylene-butylene copolymer, poly(1-butene), polybrene, poly(acrylic acid, ammonium salt), polyamide resin, ethylene/propylene copolymer, ethylene/propylene/diene terpolymer, neoprene, polyurethane, fluorelastomer, polycarbonate, polyether sulfone, polyether ether-ketone, tetcel, and polyacrylate.

9. The IR window of claim 1 wherein the support structure further comprises one of a hexagonal, triangular, and rectangular honeycomb.

10. The IR window of claim 1 wherein the support structure further comprises a non-IR transmissive material, the non-IR transmissive material being reflective to IR energy.

11. The IR window of claim 1 wherein the first and second IR transmissive materials further comprise polytetrafluoroethelyne.

12. The IR window of claim 1 wherein the first and second faceplates comprise the same IR transmissive material.

13. A method for making an IR window for a thermal sensor comprising the steps of;

providing a honeycomb support structure;

applying a first faceplate of a polymeric IR transmissive material to the support structure; and applying a second faceplate of a second IR transmissive material to the support structure opposite the first faceplate.

14. The IR window of claim 13 wherein the first and second faceplates comprise the same IR transmissive material.

15. The method of claim 13 wherein the polymeric material is one of polyethylene, ethylene-octene copolymer, polyvinyl pyrrolidene, poly(acenaphthylene), styrene/ethylene-butylene copolymer, poly(1-butene), polybrene, poly(acrylic acid, ammonium salt), polyamide resin, ethylene/propylene copolymer, and ethylene/propylene/diene terpolymer.

16. The method of claim 13 wherein the polymeric material further comprises a fabric of polymeric fibers and a matrix of polymeric material disposed in interstices between the fibers.

17. The method of claim 16 wherein the fibers further comprise one of gel spun, polyethylene, polypropylene, nylon, polyvinyl alcohol, and polyethylene terephythalate.

18. The method of claim 16 wherein the matrix further comprises one of polyethylene, ethylene-octene copolymer, polyvinylpyrrolidone, poly(acenaphthylene), styrene/ethylene-butylene copolymer, poly(1-buten), polybrene, poly(acrylic acid, ammonium salt), polyamide resin, ethylene/propylene copolymer, ethylene/propylene/diene terpolymer, neoprene, polyurethane, fluorelastomer, polycarbonate, polyether sulfone, polyether ether-ketone, tetcel, and polyacrylate.

19. The method of claim 13 wherein the support structure further comprises one of a hexagonal, triangular, and rectangular honeycomb.

20. A thermal imaging system comprising:

a housing having a cavity therein;

a thermal sensor in the cavity of the housing; and an IR window in an opening of the cavity covering the thermal sensor, the IR window further comprising, first and second faceplates formed from a polymeric IR transmissive material;

a honeycomb support structure between the faceplates for supporting the faceplates; and an adhesive layer between each faceplate and the support structure for adhering each faceplate to the support structure.

21. The thermal imaging system of claim 20 wherein the polymeric IR transmissive material further comprises one of polyethylene, ethylene-octene copolymer, polyvinyl pyrrolidene, poly(acenaphthylene), styrene/ethylene-butylene copolymer, poly(1-butene), polybrene, poly(acrylic acid, ammonium salt), polyamide resin, ethylene/propylene copolymer, and ethylene/propylene/diene terpolymer.

22. The thermal imaging system of claim 20 wherein the polymeric IR transmissive material further comprises a fabric of polymeric fibers and a matrix of polymeric material disposed in interstices between the fibers, wherein the fibers further comprise one of gel spun, polyethylene, polypropylene, nylon, polyvinyl alcohol, and polyethylene terephythalate, and wherein the matrix further comprises one of polyethylene, ethylene-octene copolymer, polyvinylpyrrolidone, poly(acenaphthylene), styrene/ethylene-butylene copolymer, poly(1-buten), polybrene, poly(acrylic acid, ammonium salt), polyamide resin, ethylene/propylene copolymer, ethylene/propylene/diene terpolymer, neoprene, polyurethane, fluorelastomer, polycarbonate, polyether sulfone, polyether ether-ketone, tetcel, and polyacrylate.

23. The thermal imaging system of claim 20 wherein the polymeric IR transmissive material further comprises polytetrafluoroethelyne.

\* \* \* \* \*